Patented May 6, 1952

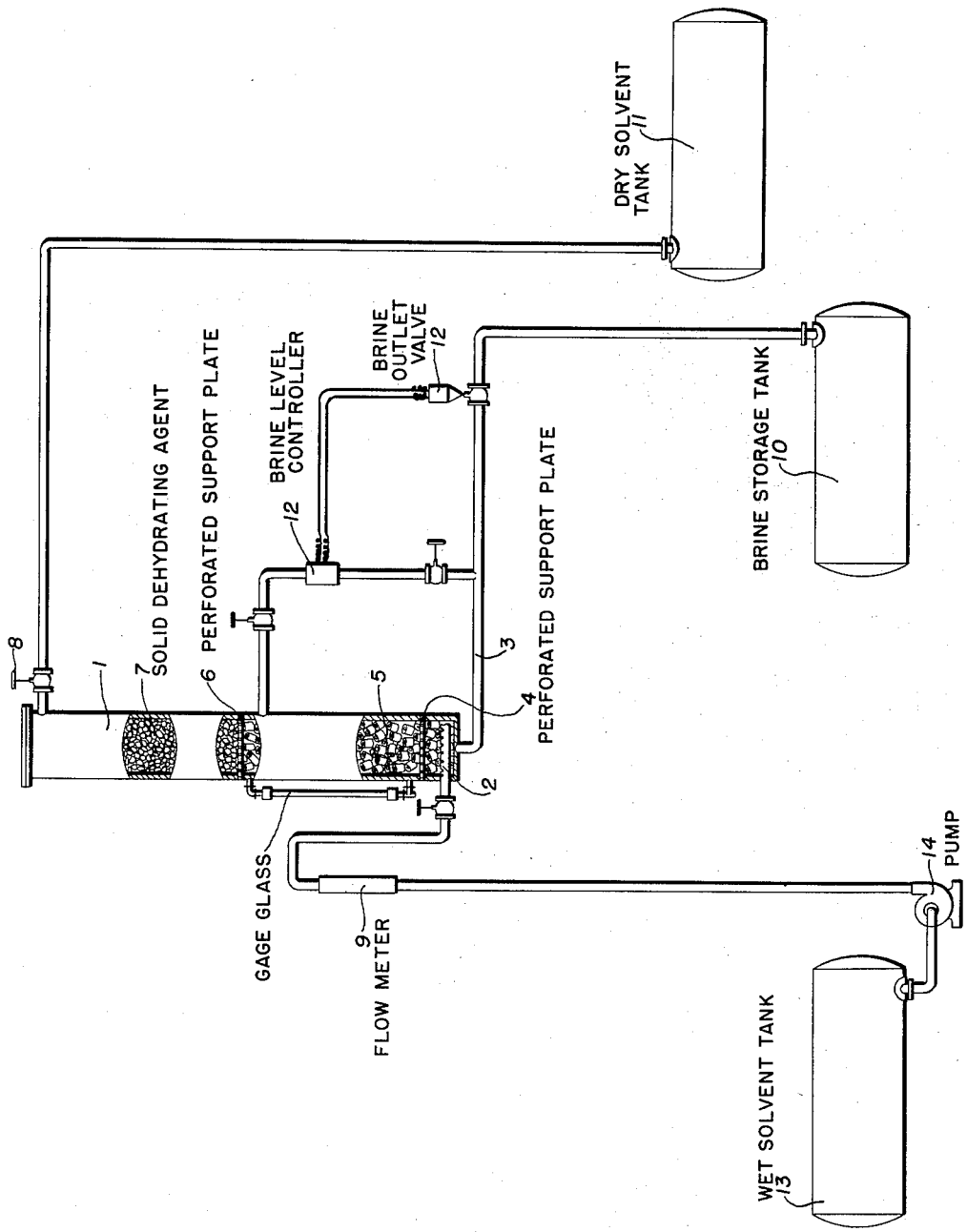

2,595,544

UNITED STATES PATENT OFFICE 2,595,544

DEHYDRATION OF ORGANIC FLUIDS

Ernest A. Rodman, Newburgh, N. Y., assignor to E. I. du Pont de Nemours & Company, Wilmington, Del., a corporation of Delaware Application June 18, 1946, Serial No. 677,505

5 Claims. (Cl. 210—42.5)

This invention relates to the treatment of organic fluids and particularly to the dehydration of organic fluids, and still more particularly to the dehydration of organic liquids.

In the recovery of organic solvents from coating compositions it is common practice to draw solvent laden air over a bed of activated carbon which adsorbs the solvents. As soon as the carbon bed becomes saturated, the solvent is steam distilled from the carbon beds and the distillate of water and organic solvents is then rectified or separated into the individual components by distillation.

The majority of the common organic solvents form azeotropes with water and are usually separated from the water by treating with a dehydrating agent. The treatment of the organic solvents with dehydrating agents is sometimes a batch-wise process which comprises adding a dehydrating agent to the water wet organic solvent, agitating the dehydrating agent in the water wet solvent, allowing the aqueous solution of the dehydrating agent to separate from the solvent and form a separate layer, and removing the organic solvent from the aqueous layer by decanting. This process is repeated several times until the water content is reduced to the desired point. This method of drying does not remove the last 1 to 3% of water and to remove the last traces of water it is usually necessary to resort to distillation whereby the remaining water comes over as an azeotrope in the first fraction and is returned for further dehydrating treatment.

In addition to the batchwise process of dehydrating solvents, a continuous process has been used heretofore which involves passing the water wet organic solvent through a bed or tower of solid dehydrating agent and continuously drawing off an aqueous solution of the dehydrating agent at the bottom of the tower and continuously flowing the dried solvent out the top of the tower. This process is not economical to operate; and since the concentration of the aqueous solution of the dehydrating agent becomes supersaturated, the dehydrating agent will freeze and clog the outlets. A modification of the continuous process is to flow the water wet solvent through a tower counter-current to an aqueous solution of a suitable dehydrating agent which is continuously introduced near the top of the tower. This modification of the above mentioned continuous process is not economical to operate due to the relatively large consumption of dehydrating agent.

The prior art methods (batch and continuous) have been used in the past with varying degrees of success. The primary disadvantages of the prior art methods are the inefficient drying of the solvent, inability to remove the last 1 to 3% of water and large consumption of dehydrating agent.

Besides the distillation and extraction methods, it is possible to dehydrate by other processes, such as freezing and filtering out ice crystals, reacting the water chemically with materials such as lime, or adsorption of the water on materials such as silica gel. The freezing method is economical only when there is a low-cost source of refrigeration and the ratio of water to organic solvent is small. The adsorbents and reactants are also only economically practical where the ratio of water to organic solvents is also small.

An object of this invention is the provision of an economical process for the separation of a mixture of fluids into their separate components. Another important object is the provision of a process for the efficient and economical drying of water wet organic fluids which reduces the time required by prior art methods and also reduces the consumption of dehydrating agent. A further object is the provision of a process for the substantially complete drying of water wet fluids which does not require further rectification before re-using, and requires a minimum of operating manipulation.

These and other important objects are accomplished by combining in a single operating unit, a bed of solid dehydrating agent superimposed over a layer of solution of the dehydrating agent which flows counter-current to the direction of flow of the fluid to be dehydrated.

In order that the invention will be understood more fully, the following is given by way of illustration and not limitation.

A mixture of water and methyl ethyl ketone was distilled in a conventional distillation column, one of the distillates consisted of an azeotrope of methyl ethyl ketone (88.7%) and water (11.3%) boiling at 73.4° C. The azeotrope was further treated to remove the water from the methyl ethyl ketone as described hereinafter.

In the drawing, the single figure is a flow sheet which diagrammatically shows how the invention is carried out. In the figure 1 is a tower which on a plant scale is about 15 feet in height and 16 inches inside diameter, and is provided with a sparger inlet 2 for the water wet methyl ethyl ketone located about 3 inches above the bottom brine outlet 3. About 3 inches above the sparger 2 is a perforated support 4 for Raschig rings 5, which approximately fills the lower half of the tower 1. Superimposed over the Raschig rings 5 is another perforated support 6 for solid calcium chloride 7 of irregular hazelnut size (lateral dimension ¼" to ½") which fills the top half of the tower 1 to within 1 to 4 feet of the outlet 8 which leads off the substantially dry solvent at the top of the tower. The brine discharges from the bottom of the tower through the brine outlet 3. The brine is drawn off through outlet 3 and is collected in a storage tank 10. In order to control the level of the interface in the bottom half of the tower, there is provided a level controller 12, which is operated by the difference in specific gravity of the brine and the methyl ethyl ketone and which automatically regulates the flow of brine from the bottom of the tower. The approximate specific gravity at 20° C. of a 20% aqueous solution of calcium chloride is 1.1775 and methyl ethyl ketone is .8047. As the water wet methyl ethyl ketone is introduced in the bottom of the tower from a storage tank 13, through a pump 14, flow meter 9, and sparger 2, the methyl ethyl ketone and some water rise and are intimately mixed with the downward flow of brine in the bottom packed portion of the tower 1 due to the differences in specific gravity mentioned above. The brine forms where the water contacts the solid calcium chloride 7 and is diluted as it contacts additional water in the upward moving liquid. The ratio of water wet methyl ethyl ketone, being continuously introduced in the tower through sparger 2 near the bottom to the brine being continuously drawn off at the bottom of the tower through outlet 3, is adjusted so that approximately a 20% solution of calcium chloride in water is continuously removed. As the water wet methyl ethyl ketone rises through the tower, the water is progressively removed by the brine and solid calcium chloride. The substantially dry methyl ethyl ketone flows from the top of the tower through outlet 8 and is collected in storage tank 11. The solid calcium chloride is introduced in the top of the tower periodically to maintain a column at least 6 inches above its grating support 6 at the middle of the tower. Preferably the calcium chloride column is maintained at 1 to 4 feet depth to assure the substantially complete removal of water from the methyl ethyl ketone. In the lower half of the tower the calcium chloride solution is progressively diluted at it flows downward over the Raschig rings 5 by the removal of water from the incoming water wet methyl ethyl ketone, which reduces the consumption of the calcium chloride over methods heretofore known for an equivalent removal of water.

A typical operating condition is indicated by the following table:

Input per hour of water wet methyl ethyl ketone at bottom of column _____ 2,200 lbs. (88.2% methyl ethyl ketone, 11.8% water)

Input per hour of calcium chloride at top of column. _____ 95 lbs. (79.0% calcium chloride; 21.0% water)

Output per hour of calcium chloride brine__ 355 lbs. (74.6% water; 21.0% calcium chloride; 4.4% methyl ethyl ketone)

Output per hour of substantially dry methyl ethyl ketone at top of column____ 1,940 lbs. (99.3% methyl ethyl ketone; 0.7% water)

For certain applications the methyl ethyl ketone drawn off from the top of the tower can be re-used without further treatment. The ratio of dry methyl ethyl ketone drawn off at the top of the tower and the brine at the bottom can be adjusted so that the water content of the methyl ethyl ketone drawn off at the top of the column will not exceed .25%. The brine liquor drawn from the bottom of the tower may be distilled to recover the small proportion of methyl ethyl ketone dissolved in the brine.

In the preferred embodiment described above, the column of the solid dehydrating agent is superimposed over the brine column. It is also possible to have the single operating unit arranged so that the column of solid dehydrating agent is positioned other than directly above the brine column with suitable connections for the flow of the fluids.

While the above description illustrates the separation of water from methyl ethyl ketone, the process can also be used in separating other liquid mixtures. In the case of a mixture of methyl ethyl ketone, ethyl alcohol and water, the ethyl alcohol and water can be separated from the methyl ethyl ketone as outlined above for the separation of water and methyl ethyl ketone. Other liquid mixtures such as aliphatic hydrocarbons and water, aromatic hydrocarbons and water, mixtures of aliphatic and aromatic hydrocarbons and water, ethyl acetate and water, or any other mixture of non-aqueous liquids in which case one of the components selectively forms a solution with the dehydrating agent and the other is substantially insoluble in the brine formed by one of the components and the dehydrating agent.

In addition to the separation of liquid mixtures into their individual components the invention can also be used in separating mixtures of gases and liquids, such as, e. g., divinyl acetylene and water, beta chlor butadiene and water, ethylene and water, and air and water.

In addition to calcium chloride other dehydrating agents can be used, such as, e. g., sodium sulfate, magnesium sulfate, sodium chloride, and copper sulfate. Any other solid material may be used as a dehydrating agent which selectively forms a solution with at least one of the components of the mixture being separated into its individual components.

By the term "brine" as used throughout the specification and appended claims is meant a solution of the dehydrating agent in one or more of the components of a mixture being rectified.

By the term "dehydrating agent" as used throughout the specification and appended claims is meant a substance which selectively forms a solution with one of the components of a mixture being separated into its individual components.

It will be readily apparent to those skilled in the art of solvent rectification that many widely different embodiments of this invention may be made without departing from the spirit and scope thereof; and, therefore, it is not intended to be limited except as defined in the appended claims.

I claim:
1. The process of dehydrating an organic liquid contaminated with water, which comprises dispersing the liquid into the bottom of a column of an aqueous solution of a water-soluble dehydrating salt, the concentration of the solution being relatively dilute at the bottom and relatively concentrated at the top, said organic liquid having a specific gravity less than that of the said dilute salt solution, removing a portion of the water contained in the organic liquid by allowing it to rise through the column of the salt solution, subsequently removing more water from the partially dehydrated liquid by passing it upwardly through a second column containing particulate solid dehydrating salt whereby a concentrated aqueous solution of the salt is formed, causing the said concentrated salt solution to flow downwardly in the first-mentioned column and become progressively diluted with the water in the said organic liquid flowing upwardly through said column of dehydrating salt solution and withdrawing dilute spent salt solution from the base of the first-mentioned column of solution and the substantially dehydrated organic liquid at the top of the column containing the said solid salt.

2. The process of claim 1 in which the organic liquid is methyl ethyl ketone.

3. The process of claim 1 in which the dehydrating agent is calcium chloride and the dilute salt solution contains about 20% calcium chloride as it is drawn off.

4. An apparatus for dehydrating low specific gravity organic liquids contaminated with water which comprises two interconnecting chambers, one positioned above the other, the lower chamber having an inlet at its bottom including a sparger for distributing the incoming organic liquid uniformly at the base of the said chamber, a body of an aqueous solution of a water-soluble dehydrating salt in the said lower chamber, the said solution being relatively dilute at the bottom and relatively concentrated at the top, a perforated plate at the base of the upper chamber, a body of solid dehydrating water-soluble salt above the said perforated plate, means for allowing the aqueous salt solution formed in the upper chamber to drain into the upper part of the lower chamber, means for preventing the salt solution in the lower chamber from rising into the upper chamber and means for withdrawing the substantially dry organic liquid from the top of the upper chamber after it passes through the body of particulate solid dehydrating salt.

5. The apparatus of claim 4 in which the dehydrating salt is calcium chloride.

ERNEST A. RODMAN.

REFERENCES CITED

The following references are of record in the file of this patent:

UNITED STATES PATENTS

| Number | Name | Date |
|---|---|---|
| Re. 15,783 | Hammond | Mar. 4, 1924 |
| 1,367,993 | Stahl | Feb. 8, 1921 |
| 1,452,206 | Mann | Apr. 17, 1923 |
| 1,988,740 | Kingmann | Jan. 22, 1935 |
| 2,193,569 | Seaton | Mar. 12, 1940 |
| 2,193,570 | Seaton | Mar. 12, 1940 |
| 2,253,755 | Brant | Aug. 26, 1941 |
| 2,276,560 | Bird | Mar. 17, 1942 |
| 2,322,469 | Robson | June 22, 1943 |
| 2,327,779 | Fisher et al. | Aug. 24, 1943 |
| 2,338,986 | Waterman | Jan. 11, 1944 |

FOREIGN PATENTS

| Number | Country | Date |
|---|---|---|
| 23,073 | Great Britain | of 1899 |